Patented July 29, 1952

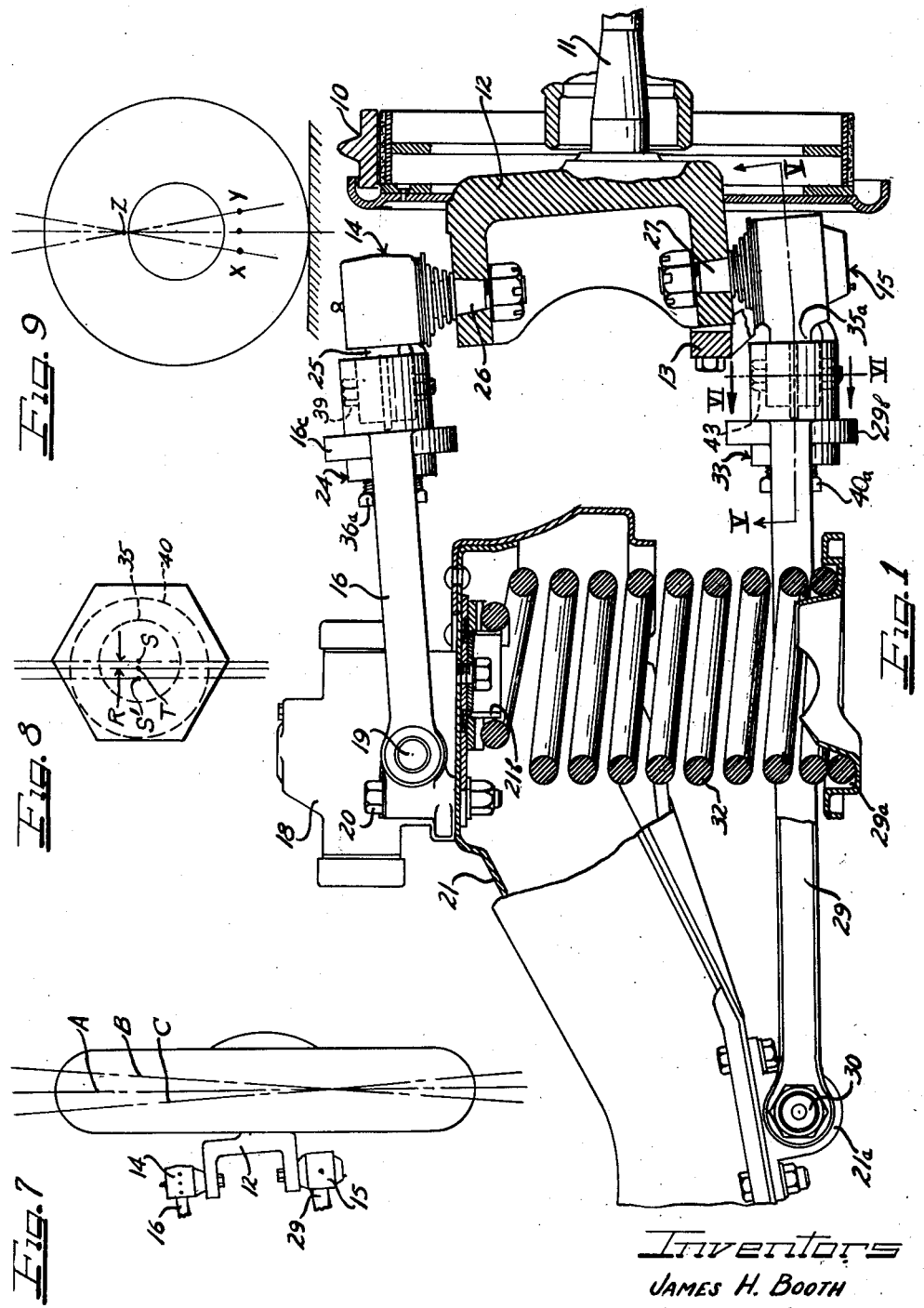

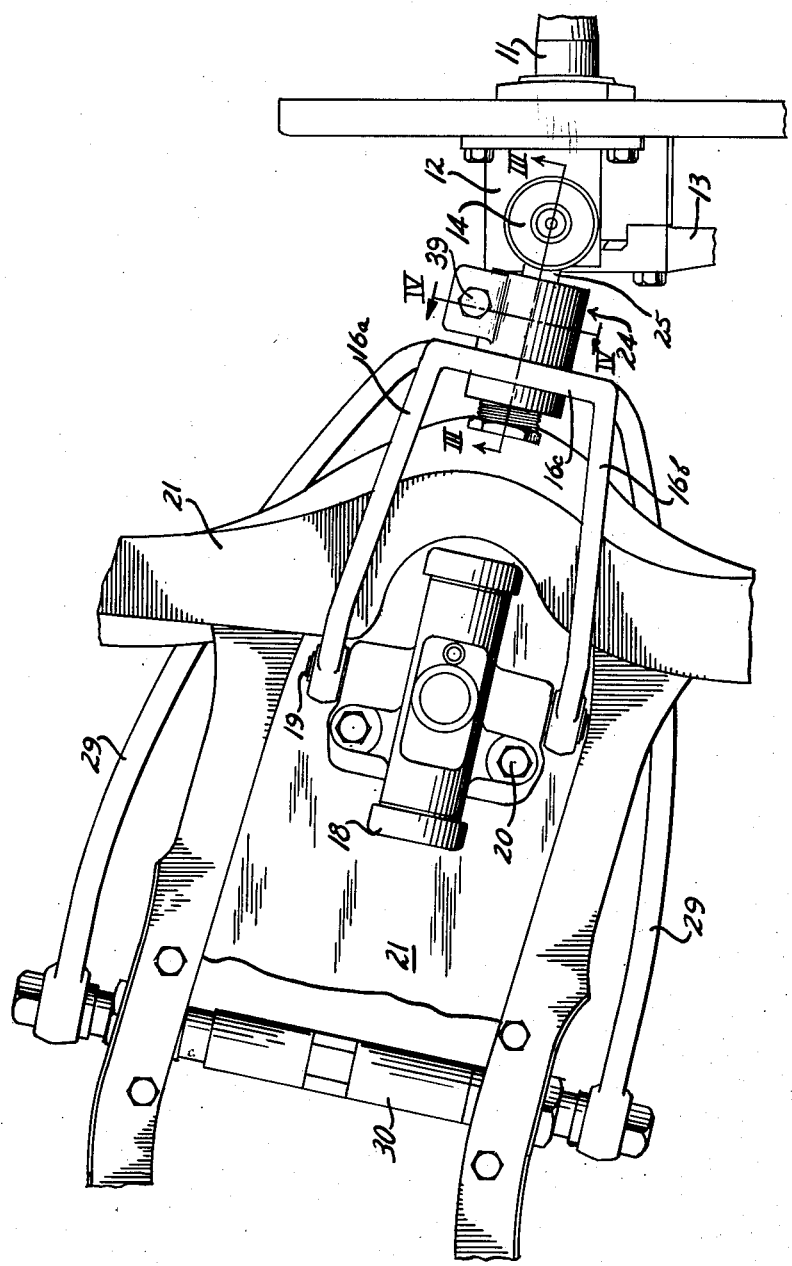

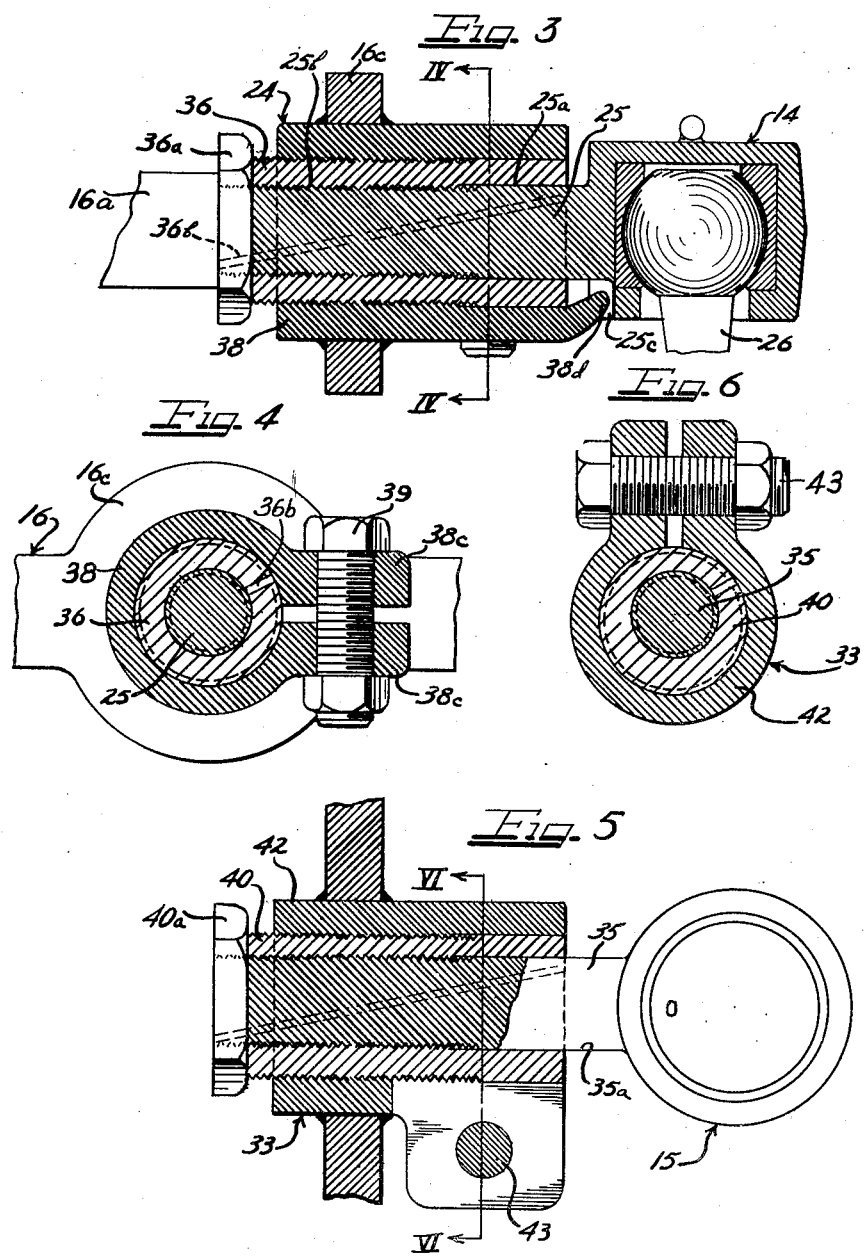

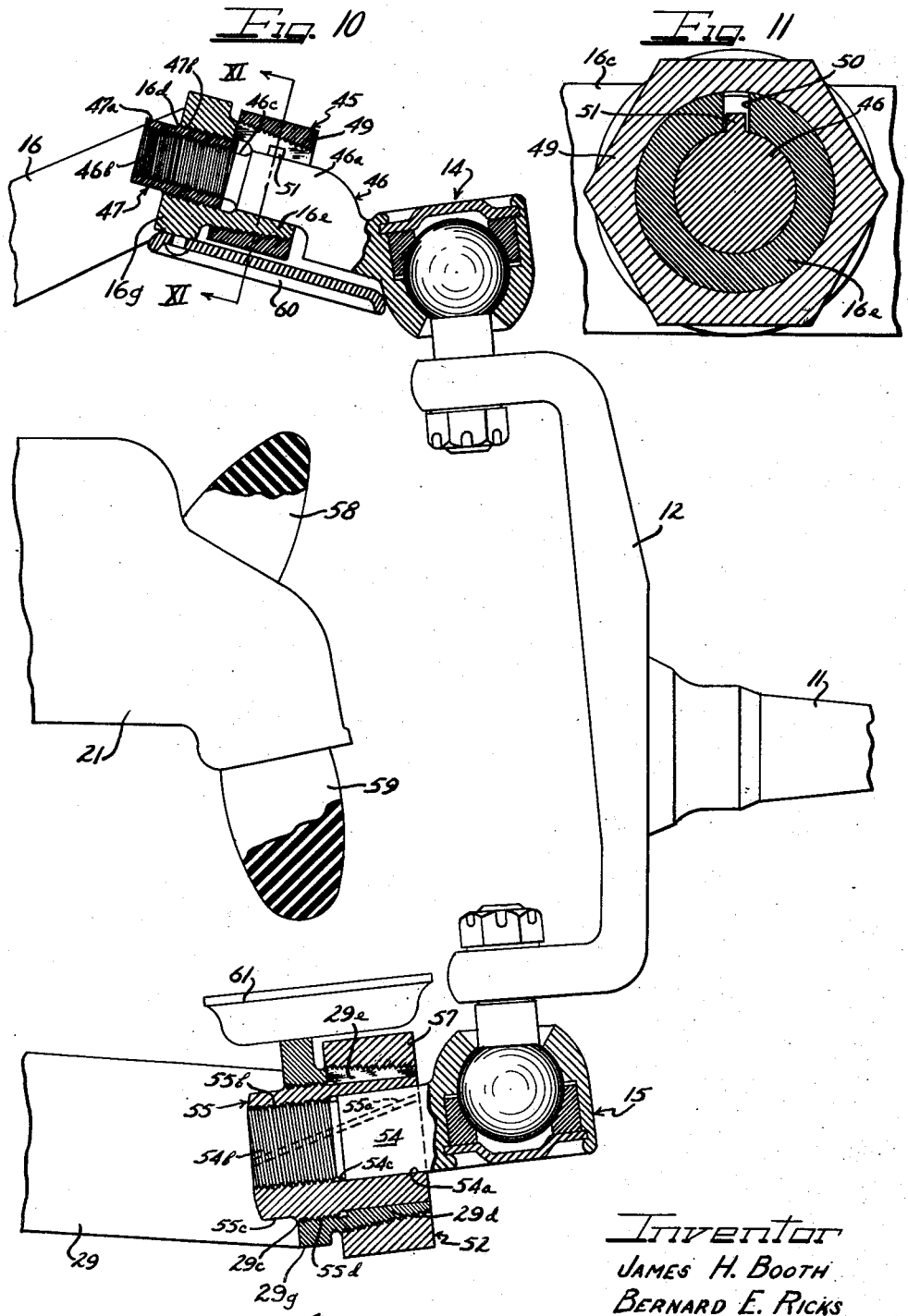

2,605,118

UNITED STATES PATENT OFFICE 2,605,118

INDIVIDUAL WHEEL SUSPENSION, INCLUDING CASTER AND CAMBER ADJUSTING MEANS

James H. Booth, Corunna, and Bernard E. Ricks, Ferndale, Mich., assignors to Thompson Products, Inc., Cleveland, Ohio, a corporation of Ohio Application November 22, 1947, Serial No. 787,518

7 Claims. (Cl. 280—96.2)

This invention relates to wheel suspension apparatus for automobiles. More particularly, this invention relates to wheel suspension apparatus for automotive vehicles wherein the swivel joints secured at the outer ends of the lower and upper control arms are capable of adjustment to regulate the camber and caster angles of the vehicle.

As is well known in the automotive field, the front steering road wheels of an automobile are inclined downwardly and inwardly at an angle from the vertical. This angle is known as the camber angle. In addition the vertical steering axis is also tilted toward the rear to give the wheels a trailing effect for causing the automobile to steer a straight course. This angle is known as the caster angle.

When the wheel suspension system is originally assembled, the mechanism is installed at the correct camber and caster angles. However, due to wear, collisions or running into curbing or the like, the wheel suspension system is often jarred out of alignment.

In accordance with the teaching of the present invention adjustments for camber and caster are quickly and easily made by adjusting joints located at the outer ends of the upper and lower control arms of a typical independent wheel suspension system. These joints are preferably of the ball joint type and are connected to the upper and lower ends of a rigid steering knuckle which carries the wheel spindle.

Axial adjustment of a stem on the upper ball joint housing causes pivoting of the spindle in a substantially vertical plane through the axis of the spindle about the lower ball joint and thus affords a means for adjusting the camber angle.

Rotation of a screw member having one threaded member eccentrically disposed around the stem of the lower ball joint housing shifts the steering knuckle laterally or forwardly and rearwardly relative to the upper ball joint. This shifting adjusts the caster angle.

There is further provided in this invention means for locking each adjustment mechanism in place after the camber and caster adjustments have been made. In one embodiment this locking means is provided by a split clamping sleeve rigidly secured to the control arm and arranged to be pressed into clamping engagement about the screw member of the adjustment mechanism, while in a second embodiment a lock nut is disposed over a split clamping sleeve which has a tapered exterior threaded surface and is arranged to be pressed tightly against the stem of the ball joint to lock the assembly.

Thus, adjustments for camber and caster can quickly be made by means of screw members which may be conveniently manipulated by a simple end wrench.

It is therefore an object of this invention to provide apparatus for quickly and accurately adjusting the camber and caster angles of an independent wheel suspension.

Another object of this invention is to provide wheel suspension apparatus whereby adjustments for camber and caster may be made independently of each other.

A further object of this invention is to provide a wheel suspension having adjustable ball joints connecting the steering knuckle and the wheel arms arranged to shift the axis of the steering knuckle to selectively vary the camber and caster angle of the wheel.

It is a specific object of this invention to provide a wheel suspension system employing ball type joints, said joints having screw connections for shifting the axis of the steering knuckle to adjust the camber and caster angles for the wheel.

Other and further objects of this invention will be apparent to those skilled in the art from the following detailed description of the annexed sheets of drawings, which illustrate one embodiment of the invention.

On the drawings:

Figure 1 is a fragmentary rear end elevational view with parts in vertical cross section and with other parts broken away, of an adjustable dirigible wheel suspension apparatus of this invention;

Figure 2 is a fragmentary top plan view of the adjustable wheel suspension apparatus of this invention;

Figure 3 is a vertical sectional view, with parts in elevation, taken on line III—III of Fig. 2;

Figure 4 is a fragmentary vertical sectional view taken substantially on line IV—IV of Fig. 3;

Figure 5 is a fragmentary vertical sectional view taken on line V—V of Fig. 1;

Figure 6 is a fragmentary vertical sectional view taken on line VI—VI of Fig. 5;

Figure 7 is a diagrammatic sketch showing the camber adjustments according to the teaching of this invention;

Figure 8 is a diagrammatic sketch of a portion of the adjustment mechanism of the wheel suspension device of the present invention, showing particularly the eccentricity of the members of this adjustment device;

Figure 9 is a diagrammatic showing of the adjustments for caster angle;

Figure 10 is a fragmentary end elevational view, with parts in vertical cross-section and with other parts broken away, of a second embodiment of the adjustable dirigible wheel suspension apparatus of this invention; and Figure 11 is a vertical sectional view taken on lines XI—XI of Fig. 10.

As shown on the drawings:

In Fig. 1 a typical right front wheel suspension arrangement for an automobile is shown, as viewed from the rear of the car. It will, of course, be recognized that the complete system includes an identical suspension device, oppositely disposed at the left side of the vehicle. The novel adjustable ball joints of the present invention must be mounted on the wheel suspension at both sides of the vehicle, since the camber and caster angles of each steering wheel must be adjusted.

Reference numeral 10 designates the brake drum of a typical road wheel rotatably mounted in the conventional manner on a wheel spindle 11. The spindle 11 is preferably formed integral with a steering knuckle 12, which is supported for swinging, steering movement at its upper and lower ends in ball joints 14 and 15, respectively. Steering movement of the steering knuckle 12 is accomplished through a rearwardly extending steering arm 13 which is controlled from the driver's seat through the conventional tie-rod and drag link.

The upper ball joint 14 is arranged to permit swinging of the knuckle 12 and at the same time is adapted to accommodate pivoting in a substantially vertical plane of an upper control arm 16. The control arm 16, as seen in Fig. 2, comprises a U-shaped member having leg portions 16a and 16b straddling a shock absorber 18, being pivotally attached to opposite ends of the operating shaft 19 of the shock absorber. A plurality of bolts 20 secure the shock absorber to a cross frame member 21 of the vehicle.

As best seen in Figs. 1, 2 and 3, the cross part or bight 16c of the U-shaped control arm 16 has an aperture therethrough at its central portion receiving an adjusting assembly 24. The housing of the adjusting assembly 24 is welded or otherwise affixed to the arm 16 and will be described in detail hereinafter. A threaded stem 25 integral with the housing of the ball joint 14 extends outwardly therefrom into the housing of the assembly 24. A ball stud 26, disposed for pivoting and rotation in the joint 14, has a tapered shank portion wedged in a hole in the top of the knuckle 12 by means of a nut threaded on the end of the stud.

The lower ball joint 15 is arranged to accommodate the swinging, steering movement of a stud 27 which has a tapered portion wedged in a hole in the bottom of the knuckle 12 by a nut threaded on the end of the stud. The joint 15 also permits pivoting in a substantially vertical plane of a lower control arm 29 which straddles, at its inner end, a downwardly extending portion 21a of the frame member 21, being connected at either end of the portion 21a to a pivot pin 30 extending therethrough. Upper pivoting movement of the control arm 29 is resisted by a coil spring 32 which has its lower end disposed in an annular groove 29a of a support plate affixed to the lower control arm 29, and its upper end guided about a downwardly projecting cylindrical portion 21b of the frame member 21.

As seen in Fig. 1, the bight portion or cross member 29b at the outer end of the lower control arm 29 supports a screw type adjustment assembly 33, which includes a threaded stem 35, Fig. 5, formed integral with the housing of the ball joint 15.

Thus, it is seen that the road wheel is mounted on the upper and lower control arms by means of upper and lower ball joints which accommodate pivotal swinging movements of the arms as well as steering movements of the knuckle 12. It is also evident that if the effective length of the upper control arm 16 is shortened or lengthened, the steering knuckle 12, and consequently the wheel, will pivot about the lower ball joint 15 inclining the upper part of the wheel inwardly or outwardly with respect to the vertical. In the present invention this adjustment to the effective length of the upper control arm 16 is made through the screw assembly 24, thus providing means for regulating the camber angle.

Also, it will be readily seen that if the stem 35 of the lower ball joint 15 is displaced toward the front of the vehicle or toward the rear of the vehicle, the axis of the steering knuckle 12 which determines the steering axis of the wheel, will pivot forwardly or backwardly about the upper ball joint 14. This pivoting of the steering axis wheel about the upper ball joint is effective to make adjustments to the caster angle and is carried out in this invention by means of the assembly 33 and the adjustable screw members that are eccentrically mounted therein.

Camber adjustments

In Figs. 3 and 4, the adjusting assembly 24 is ilustrated in detail. It comprises the threaded adapter arm 25 of the joint 14 which has a smooth shank portion 25a and a left-hand threaded portion 25b of smaller diameter than the shank portion 25a. A bushing 36, surrounds the arm 25 having threads on its inner diameter for a portion of its length, said threads mating with the threads of the arm 25. At one end a nut 36a is integrally secured to the bushing 36. A clamping sleeve 38, having an internal right-hand threaded portion extending for a portion of its length and a smooth bore portion for the rest of the length, is split at one side, Fig. 4, and has a pair of projecting flanges 38c for receiving an adjusting bolt 39.

The bushing 36 has a diagonal slot 36b cut through its wall so that, as the bolt 39 is tightened, a clamping action will take place through both the outer and the inner threads of the bushing causing it to tighten securely on the threads of the adapter arms 25. The clamping sleeve 38 also locks the bushing tightly against the smooth shank 25a of the arm 25 and hence any impact on the wheel will be taken through the smooth shank portion of the arm 25 and not through the threads.

Rotation of the ball joint 14 with respect to the clamp 38 is prevented by a projecting member 38d which extends into a slot 25c of the joint housing (Fig. 3).

As previously mentioned the bight portion member 16c of the upper control arm 16 receives and is secured as by welding to the clamping sleeve 38 of the adjustable member 24. Therefore the clamping sleeve 38 is held against rotation by the member 16c and the ball joint 14 is held against rotation by the projection 38d.

Then, with the bolt 39 of the clamp 38 loosened, the effective length of the upper control arm can be varied by turning the nut 36a of the bushing 36 in a clockwise direction. This will cause the bushing 36 to move into the threaded portion of the clamping sleeve 38 on the right-hand threads while causing the arm 25 to move out of the bushing on the left-hand threads. Thus, the joint 14 will be pivoted outwardly on the lower ball joint 15 and the effective length of the upper control arm 16 will be increased.

Counterclockwise rotation of the nut 36a will, of course, cause the opposite effect, namely, shortening the effective length of the control arm.

In Fig. 7, a diagrammatic sketch of the camber angle adjustment is illustrated. The line A is a vertical line and, in the wheel illustrated, it passes through the center of the tire on the wheel. Thus, there is no camber angle in this illustration. The line B indicates how the wheel can be pivoted to the right about the lower ball joint 15 by increasing the effective length of the upper control arm 16, thus providing a positive camber angle. The line C illustrates how counterclockwise rotation of the nut 36a, shortens the effective length of the control arm 16 and causes the wheel to pivot in the opposite direction to provide negative camber.

Thus, there is provided in this invention a simple, efficient screw-type adjustment member by means of which the camber angle of the steering wheel can be quickly and accurately adjusted.

Caster adjustments

The adjustment assembly 33 on the lower control arm is illustrated in Figs. 5 and 6. It is essentially the same as the adjustment assembly 24, having a right-hand threaded stem member 35 screwed into a longitudinally split bushing 40 which has a bolt head portion 40a and right-hand external threads in contact with the threads of a split clamping sleeve 42. A bolt 43 is used to securely lock the clamping sleeve 42 around the bushing 40 and the arm 35. As in the adjusting assembly 24, the arm 35 has a smooth shank portion 35a in contact with a smooth portion of the bore of the bushing 40, so that impact loads may be transmitted through the shank rather than through the threads.

It is to be noted, however, that since the bushing 40 of this adjustment assembly 33 has right-hand threads on its external and internal surfaces, rotation of the nut 40a will not cause lengthening or shortening of the control arm since the movement of the bushing in relation to the clamp member will be counteracted by the movement of the bushing in relation to the threaded arm members 35.

Adjusting assembly 33 differs from adjusting assembly 24 in that the stem 35 is eccentrically disposed in the bushing 40 as shown in Fig. 6. In Fig. 8 the letter D indicates the distance between the center S of the stem 35 and the center T of the bushing 40. It will be readily seen that if the clamp sleeve 42 is loosened and the bushing 40 is rotated through 180°, the center S of the stem will move to position S' and be displaced a distance equal to twice the distance A between the original centers. The displacement of the center B of the stem 35 will be best understood by referring to Fig. 6 wherein it is clearly shown that the bushing 40 rotates in the clamp 42 and the stem 35 moves with the bushing.

In Fig. 9, the points X and Y indicate the maximum adjustments of the stem 35 about the upper ball joint 14 which is indicated by the letter Z.

Thus there is provided in this invention a means for adjusting the caster angle by eccentric adjustments of the stem 35 in the bushing 40. It will of course be understood that while Fig. 8 illustrates the maximum adjustment of the arm 35, any adjustment between these points can be had by a corresponding rotation of the nut 40a.

In Fig. 1 it is seen that the adjusting nut 36a on the upper control arm and 40a on the lower control arm are easily reached from the front of the vehicle or from underneath the vehicle thus providing convenient access to the mechanism for adjusting the camber and caster angles.

A second embodiment of the wheel suspension apparatus of this invention is illustrated in Figures 10 and 11 wherein parts substantially identical with parts described in connection with Figures 1 to 9 have been marked with the same reference numerals.

In Figure 10 the wheel spindle 11 on the knuckle 12 is supported through ball joints 14 and 15 from the control arm 16 and 29 as in the construction of Figures 1 and 2. However, in Figure 10 somewhat different adjusting assemblies between the control arms and ball joints are provided. Thus an upper adjusting assembly 45 mounted in the bight of the upper control arm 16 increases or decreases the effective length of this control arm by shifting a stem 46 of the ball joint 14 whenever a bushing 47 of the assembly is rotated. The stem 46 has a smooth shank portion 46a, a left-hand threaded portion 46b of smaller diameter than the shank portion 46a and an intermediate smooth stem portion 46c of smaller diameter than the threaded portion 46b. The bushing 47 surrounds the threaded portion 46b and has internal threads that mate with threads of the stem portion 46b.

The bushing 47 has a hexagonal head portion 47a and an external, right-hand threaded portion 47b which is arranged to be threaded into a tapped hole 16d in the bight or cross piece 16g of the U-shaped arm 16. A split sleeve portion 16e of the bight 16g extends outwardly therefrom to receive in its bore the smooth shank 46a of the stem 46.

The sleeve 16e has a tapered threaded external surface which receives a locking nut 49.

As best seen in Figure 11, the split sleeve 16e has a slot 50 which extends along the entire length of the sleeve providing a clamping means movable against the stem 46 of the ball joint 14 by the locking action of the nut 49. An upwardly projecting lug 51, on the stem 46, extends into the slot 50 to prevent rotation of the ball joint 14 in the sleeve 16e.

When the clamping action of the sleeve 16e on the stem 46 is released by backing the locking nut 49 off the tapered portion of the sleeve, the effective length of the upper control arm can be varied by threading the bushing 47 in or out of the bight 16g. If the bushing 47 is turned clockwise it will move into the threaded portion of the bight 16c while causing the stem 46 to move out of the bushing on the left-hand threads. Thus the joint 14 will be pivoted outwardly on the lower ball joint 15.

Counterclockwise rotation of the bushing 47 will, of course, cause shortening of the effective length of the control arm 16.

In the embodiment illustrated in Figure 10, caster adjustments are made by means of an adjusting assembly 52. This assembly comprises a stem 54 of the ball joint 15 which has a smooth shank portion 54a, a right-hand threaded portion 54b and an intermediate portion 54c of reduced diameter. A bushing 55, which has a diagonal slot 55a cut through its wall, surrounds the stem 54 having a smooth bore portion disposed snugly over the shank 54a and a portion 55b threaded over the portion 54b of the stem.

The inner end of the bushing 55 includes a hexagonal head 55c and a right-hand threaded portion 55d which extends for a portion of the length of the bushing and is threaded into a tapped hole 29c in the bight 29g of the lower control arm 29. A sleeve 29d is formed integral with the bight member 29g and extends outwardly therefrom to receive in its bore the smooth outer surface of the bushing 55. The sleeve 29d has a slot 29e along its length and a tapered external thread receiving a lock nut 57.

It is to be noted that the bore of the bushing 55 is eccentrically located in the bushing as evidenced by the varying thickness of the bushing walls shown in Fig. 10. As will be readily understood the eccentric bushing 55 will, when rotated, shift the steering knuckle 12 forwardly or rearwardly relative to the upper ball joint 14, as explained in connection with the bushing 40 illustrated in Figures 5 and 6. The locknut 57 is effective to clamp the sleeve 29d and the bushing 55 onto the stem 54.

A pair of resilient bumper members 58 and 59 are secured to the outer end of the frame 21 and are arranged to contact bumper plates 60 and 61 secured, as by riveting to the bight or cross part of the upper and lower control arms respectively.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. In a control arm type wheel suspension including a ball joint on the end of the control arm, said ball joint having a housing with a stem extending therefrom, said stem having a smooth shank portion adjacent the housing and a threaded portion remote from the housing, a bushing having an external threaded portion, an internal threaded portion in threaded engagement with the threaded portion of said stem and a smooth portion surrounding the smooth shank portion of the stem, a clamp member on the control arm and having an internal threaded portion in threaded engagement with the external thread of the bushing together with an internal smooth portion overlying the smooth portion of the bushing, the internal threads of said clamp member being of the opposite hand than the internal threads of the bushing, and means for contracting the smooth portion of the clamping member about the smooth portions of the bushing and stem to lock the assembly against relative rotation whereby the effective length of the control arm is adjustably varied by loosening of the clamp and by rotation of the bushing.

2. An adjustable wheel suspension comprising upper and lower control arms, a steering knuckle carried by said control arms, an upper ball type joint connecting said steering knuckle with said upper control arm, a lower ball type joint connecting said steering knuckle with said lower control arm and means for adjusting the effective length of one of said control arms to pivot the steering knuckle about the ball type joint connected to the other control arm, said means comprising an adapter arm secured to the housing of the ball joint connected to said one control arm, a bushing coaxially threaded on said adapter arm, a clamp secured to said one control arm and threaded on said bushing, the threads between the bushing and the adapter arm being of opposite hand to the threads between the bushing and the clamp, whereby rotation of said bushing in one direction causes said bushing to move into said clamp and causes said adapter arm to move out of said bushing to thereby increase the effective length of the said one control arm, and whereby rotation of said bushing in the opposite direction causes said bushing to back out of said clamp and causes said adapter arm to move into said bushing to decrease the effective length of the said one control arm.

3. In a wheel suspension system including a control arm, a ball joint at the end of said control arm, said joint comprising a housing member and a ball member, a caster adjusting device comprising an adapter arm secured to one of the members of the ball joint and provided with threads, a bushing threaded in the control arm and threaded on the said adapter arm, the threads between the bushing and the adapter arm being of the same hand and of the same pitch as the threads between the bushing and said control arm, the axis of said adapter arm being eccentrically disposed relative to the axis of said bushing, whereby said adapter arm is displaced transversely of its axis when said bushing is rotated, the effective length of the control arm remaining constant, and means for retaining the device in the adjusted position.

4. In a wheel suspension system including a control arm, a ball joint at the end of said control arm, a caster adjusting device comprising an adapter arm secured to the housing of the ball joint, and having a smooth shank portion adjacent the joint, the remainder of the adapter arm being threaded, a split bushing having a threaded bore with threads that mate with the threads of the adapter arm and a smooth portion for contact with the shank of said adapter arm, said bushing being provided on its external surface with a portion threaded in the same direction and with the same pitch as the internal threads in said bore and with a smooth external shank portion, a clamp member secured to the control arm and having internal threads mating with the external threads on said bushing and a contractible smooth portion surrounding the smooth shank portion of the bushing, and a clamping means associated with the clamp member for contracting the smooth portion of the clamp member on the smooth portion of the bushing for locking the thread surfaces of the clamp member with the bushing and the threaded bore of the bushing with the adapter arm, the bore of said bushing being eccentrically disposed with relation to the exterior surface of the bushing, whereby the adapter arm disposed in said bushing will be shifted transversely of its axis upon rotation of said bushing and simultaneously held stationary with respect to its axial direction.

5. In a control arm type wheel suspension including a first control arm and a second control arm, a steering knuckle, a first ball joint universally connecting the steering knuckle with the first control arm, a second ball joint universally connecting said steering knuckle with said second control arm, first means associated with said first control arm for adjusting the effective length of said first control arm, said first means comprising a first bushing threaded externally and having a concentric threaded bore, a first adapter arm secured to the housing of said first ball joint and having a threaded portion, said first bushing being threaded in said first control arm and threaded on said first adapter arm, the threads between said first bushing and said first control arm being of opposite hand to the threads between said first bushing and said first adapter arm, second means for displacing in a fore and aft direction the end of the steering knuckle connected to the second control arm, said second means comprising a second bushing having external and internal threads, a second adapter arm secured to the housing of said second ball joint and having a threaded portion, said second bushing being threaded in said second control arm and threaded on said second adapter arm, the axis of said second adapter arm being eccentric of the axis of said second bushing and the threads between the second bushing and the said second control arm being of the same hand and of the same pitch as the threads between the second bushing and the said second adapter arm whereby adjustment of caster may be made by rotation of said second bushing without affecting the camber adjustment and adjustment of the camber may be effected by rotation of said first bushing without affecting the caster adjustment.

6. An adjustable wheel suspension comprising upper and lower control arms, a steering knuckle carried by said control arms, an upper ball type joint connecting said steering knuckle with said upper control arm, a lower ball type joint connecting said steering knuckle with said lower control arm, and means for adjusting the effective length of one of said control arms to pivot the steering knuckle about the ball type joint connected to the other control arm, said means comprising an adapter arm secured to the housing of the ball joint connected to said one control arm, a bushing coaxially threaded on said adapter arm, a clamp secured to said one control arm and threaded on said bushing, the threads between the bushing and the adapter arm being of opposite hand to the threads between the bushing and the clamp, whereby rotation of said bushing in one direction causes said bushing to move into said clamp and causes said adapter arm to move out of said bushing to thereby increase the effective length of the said one control arm, and whereby rotation of said bushing in the opposite direction causes said bushing to back out of said clamp and causes said adapter arm to move into said bushing to decrease the effective length of said one control arm, said clamp comprising a split sleeve portion having an external tapered threaded surface, a locking nut having an internal tapered threaded surface cooperating with said external tapered threaded surface of said sleeve portion whereby rotation of said locking nut contracts said split sleeve portion to clamp said adapter arm in adjusted position.

7. In a wheel suspension system including a control arm, a ball joint at the end of said control arm, a caster adjusting device comprising an adapter arm secured to the housing of the ball joint and provided with threads, a split bushing threaded in the control arm and threaded on the said adapter arm, the threads between the bushing and the adapter arm being of the same hand and of the same pitch as the threads between the bushing and the said control arm, the axis of said adapter arm being eccentrically disposed relative to the axis of said bushing whereby said arm is displaced transversely of its axis when said bushing is rotated and the effective length of the control arm remains constant, means for retaining the device in the adjusted position, said means comprising a split sleeve attached to said control arm and surrounding said bushing, said split sleeve having a tapered threaded external surface, and a locking nut having an internal threaded tapered surface cooperating with the external threaded surface of said sleeve whereby rotation of the locking nut contracts the split sleeve portion about said split bushing for clamping said adapter arm in adjusted position.

JAMES H. BOOTH.
BERNARD E. RICKS.

REFERENCES CITED

The following references are of record in the file of this patent:

UNITED STATES PATENTS

| Number | Name | Date |
|---|---|---|
| Re. 19,482 | Baker | Mar. 5, 1935 |
| 373,381 | Snyder | Nov. 15, 1887 |
| 900,717 | Feaster | Oct. 13, 1908 |
| 923,724 | Sprado | June 1, 1909 |
| 2,099,114 | Holmes | Nov. 16, 1937 |
| 2,115,919 | Slack | May 3, 1938 |
| 2,123,087 | Leighton | July 5, 1938 |
| 2,154,569 | Hicks | Apr. 18, 1939 |
| 2,226,406 | Krotz | Dec. 24, 1940 |
| 2,238,879 | Dauben | Apr. 22, 1941 |
| 2,290,923 | Wahlberg | July 28, 1942 |
| 2,405,458 | Slack et al. | Aug. 6, 1946 |
| 2,444,666 | Orain | July 6, 1948 |
| 2,544,331 | Kogstrom | Mar. 6, 1951 |

FOREIGN PATENTS

| Number | Country | Date |
|---|---|---|
| 286,424 | Great Britain | Mar. 8, 1928 |
| 394,501 | Germany | May 1, 1924 |

OTHER REFERENCES

Publication: "Aeronautics" of May 17, 1916, page 323.